United States Patent
Schmidt

(10) Patent No.: US 8,230,574 B2
(45) Date of Patent: Jul. 31, 2012

(54) METHOD FOR INSERTING CONNECTING ELEMENTS IN METAL SHEETS AND CONNECTION BETWEEN A METAL SHEET AND A CONNECTING ELEMENT

(76) Inventor: Heiko Schmidt, Lappersdorf (DE)

( * ) Notice: Subject to any disclaimer, the term of this patent is extended or adjusted under 35 U.S.C. 154(b) by 579 days.

(21) Appl. No.: 12/318,030

(22) Filed: Dec. 19, 2008

(65) Prior Publication Data

US 2009/0175675 A1    Jul. 9, 2009

(30) Foreign Application Priority Data

Dec. 21, 2007 (DE) .......................... 10 2007 062 992
Mar. 28, 2008 (DE) .......................... 10 2008 016 273

(51) Int. Cl.
    *B21J 15/02* (2006.01)

(52) U.S. Cl. ............... 29/525.06; 29/525.05; 29/525.11; 29/525.01; 29/525.08

(58) Field of Classification Search ............... 29/525.01, 29/525.05, 525.06, 525.08, 525.11; 403/280
See application file for complete search history.

(56) References Cited

U.S. PATENT DOCUMENTS

| 6,751,841 | B2 * | 6/2004 | Schnabel et al. | 29/524.1 |
| 6,877,204 | B1 * | 4/2005 | Schnabel et al. | 29/512 |
| 7,160,047 | B2 * | 1/2007 | Mueller et al. | 403/283 |
| 7,347,641 | B2 * | 3/2008 | Prichard | 403/408.1 |
| 7,681,298 | B2 * | 3/2010 | Babej | 29/524.1 |
| 7,966,709 | B2 * | 6/2011 | Cheng et al. | 29/525.01 |
| 7,966,710 | B2 * | 6/2011 | Cheng et al. | 29/525.01 |
| 2003/0226249 | A1 * | 12/2003 | Schnabel et al. | 29/525.06 |
| 2005/0286970 | A1 * | 12/2005 | Babej | 403/279 |
| 2007/0084038 | A1 * | 4/2007 | Cochet | 29/524.1 |

FOREIGN PATENT DOCUMENTS

| DE | 19639007 A1 * | 3/1998 |
| JP | 2002248531 A * | 9/2002 |

* cited by examiner

*Primary Examiner* — Essama Omgba
(74) *Attorney, Agent, or Firm* — Welsh Flaxman & Gitler LLC

(57) ABSTRACT

The invention relates to a method for emplacing connecting elements in metal sheets or sheet components made of metal by inserting a bolt-like or sleeve-like joining section of the connecting element into a joining opening provided in a metal sheet, so that the connecting element bears with an extended head section against one surface side of the metal sheet and projects with a partial length of the joining section over the other surface side of the metal sheet, and by subsequent pressing of the connecting element in the metal sheet through plastic material deformation by applying a pressing force.

11 Claims, 5 Drawing Sheets

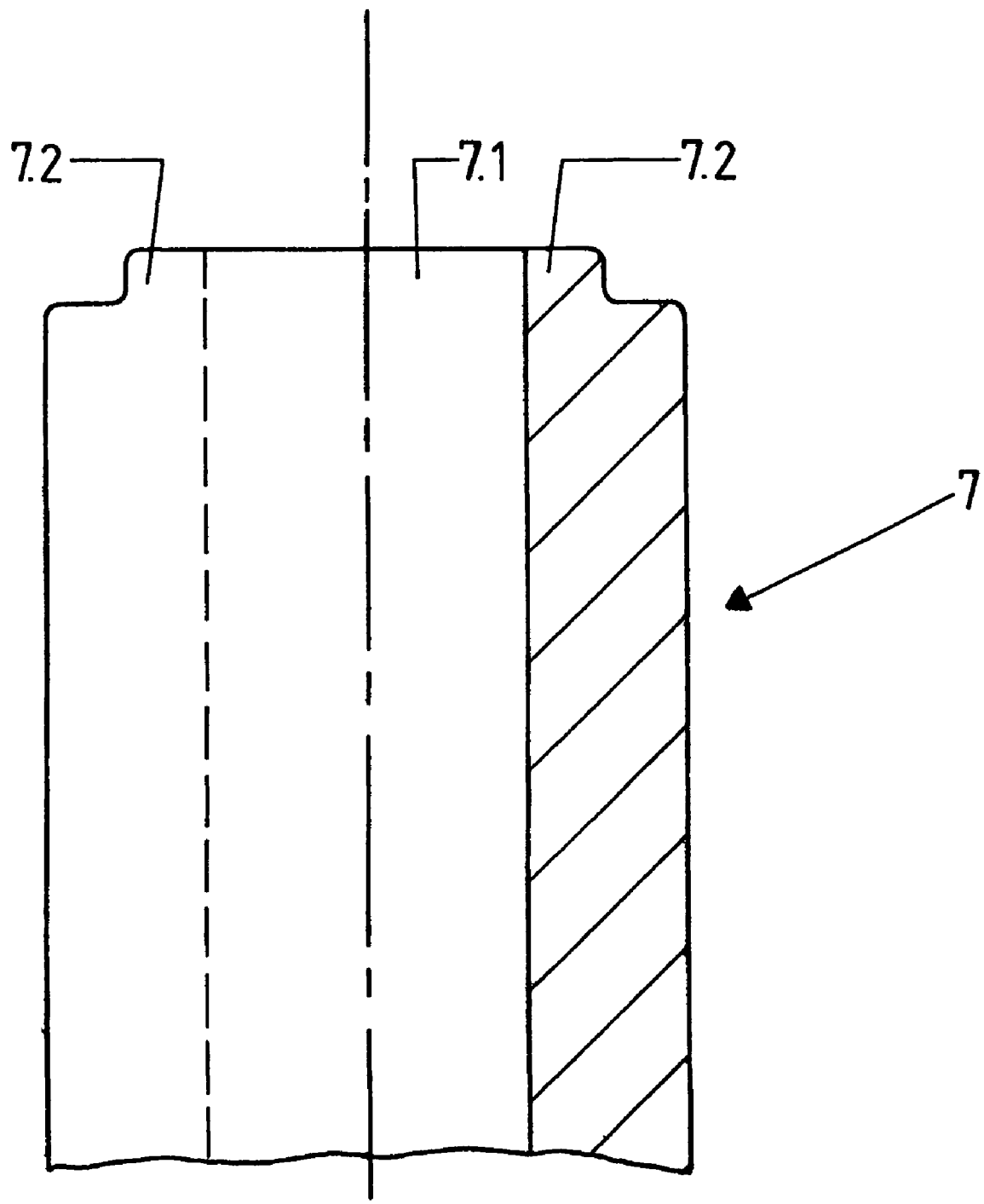

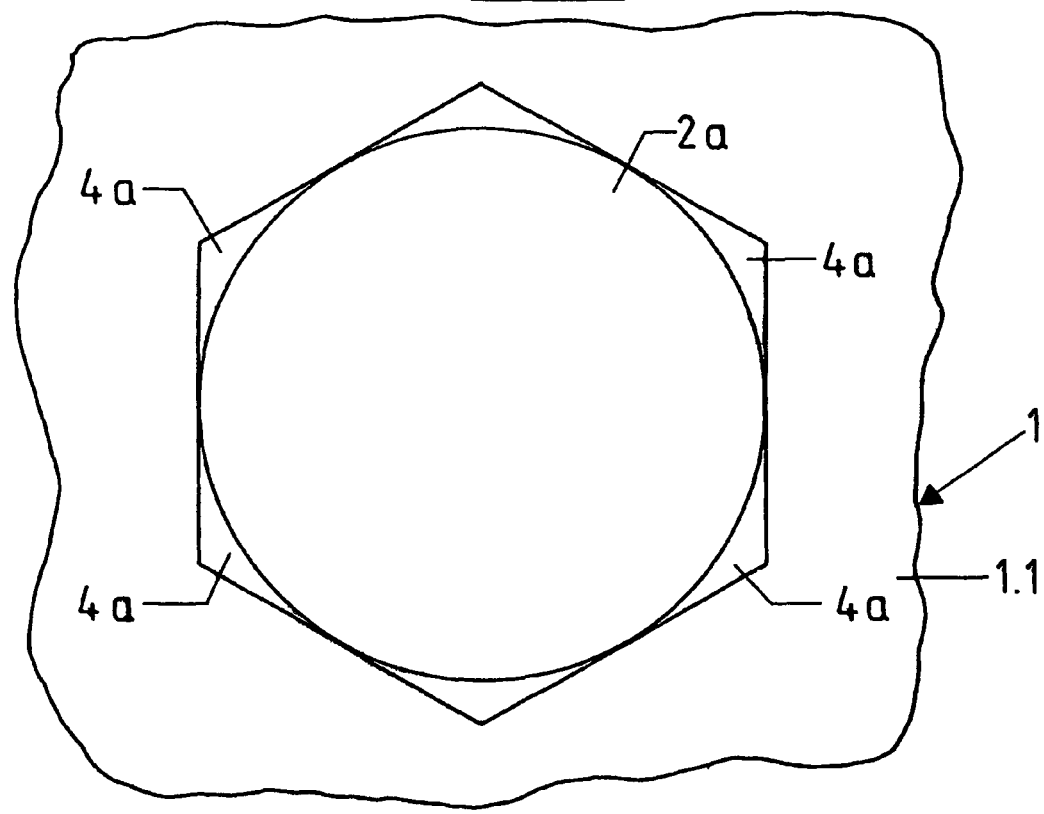
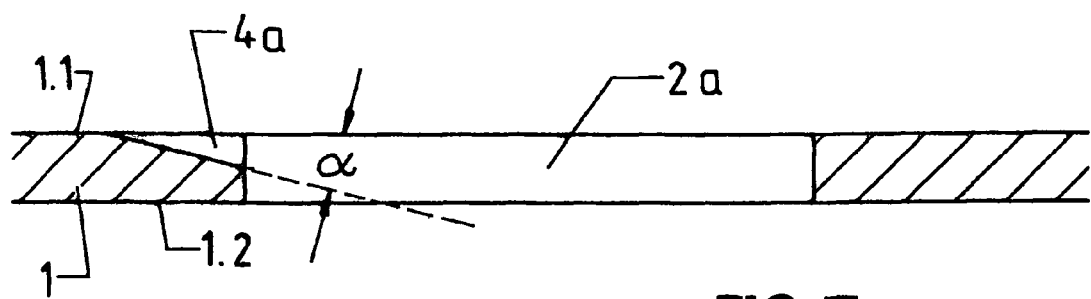

METHOD FOR INSERTING CONNECTING ELEMENTS IN METAL SHEETS AND CONNECTION BETWEEN A METAL SHEET AND A CONNECTING ELEMENT

BACKGROUND OF THE INVENTION

The invention relates to a method for inserting press-in or rivet-type connecting elements in metal sheets or components manufactured from sheet metal, and to a connection between a metal sheet and a connecting element.

Methods for inserting connecting elements in metal sheets or in components manufactured from sheet metal by joining and subsequent pressing are known in the art. The connecting elements are generally rivet and/or press nuts or bolts (threaded or unthreaded) and can appropriately be referred to as press-in and/or rivet connecting elements.

After joining, i.e. after insertion of the joining section of the respective connective element in a joining opening (prepunched hole) in the metal sheet or sheet metal component, the connecting element is fastened or anchored by being pressed with plastic deformation of the material of the sheet in the area of the joining opening in which the connecting element is to be anchored. For the connection between the metal sheet and the connecting element created by joining and pressing it is necessary that this connection has high stability against the connecting element being pressed out of the metal sheet due to axially exerted forces, in addition to high stability against twisting, i.e. it must have a sufficiently high torsional absorption. This is achieved, for example, by the fact that during pressing the material of the metal sheet yields into an undercut that already exists on the connecting element and/or is created during pressing. Especially in order to achieve the required high torsional absorption, ribs or raised areas that are present on the connecting element are formed into the metal sheet and/or the metal sheet is formed onto non-circular contours of the connecting element. For this purpose it is necessary to adjust the hardness of the metal sheet and of the connecting element made of steel so that the metal sheet has a lower hardness than that of the connecting element.

The joining and pressing of the connecting elements frequently is carried out using a so-called punching head in a tool, for example a follow-on tool, in which also the respective sheet metal part or component is manufactured from the metal sheet, e.g. by punching and/or bending.

In many technological fields, in particular in the automotive field, metal sheets with a high hardness, for example stainless steel sheets, are increasingly being used, i.e. metal sheets with a hardness that is at least the same as, and generally even higher than the hardness of the available press-in and/or rivet connecting elements, so that the known joining and pressing method can no longer be used.

It is an object of the invention is-to present a method that enables connections by joining and pressing with the required standards of quality especially with respect to press-out stability and torsional absorption also in the case of metal sheets with a hardness that is greater or at least equal to the hardness of the respective connecting element.

SUMMARY OF THE INVENTION

A method for inserting or placing connecting elements in metal sheets or sheet components made of metal, is described by inserting a bolt-like or sleeve-like joining section (3.1) of the connecting element (3) into a joining opening (2, 2a) provided in a metal sheet (1), so that the connecting element bears with an extended head section (3.2) against one surface side (1.2) of the metal sheet (1) and projects with a partial length of the joining section (3.1) over the other surface side (1.1) of the metal sheet (1), and by subsequent fixing of the connecting element (3) in the metal sheet through plastic material deformation by applying a pressing force, wherein that in the case of use of a metal sheet (1) with a hardness that is the same or higher than the hardness of the connecting element (3), the joining opening (2, 2a) is designed with at least one edge-side profile (4, 4a, 4b) at least on the other surface side (1.1) of the sheet (1), and that during pressing the joining section (3.1) is plastically deformed to form anchoring areas (8.1) extending into the at least one edge-side profile (4, 4a, 4b).

Also described is a Connection between a connecting element and a metal sheet or sheet component made of metal, manufactured by inserting a bolt-like or sleeve-like joining section (3.1) of the connecting element (3) into a joining opening (2, 2a) provided in the metal sheet (1), so that the connecting element (3) bears with an extended head section (3.2) against one surface side (1.2) of the metal sheet (1), and by pressing and fixing in the metal sheet with plastic material deformation wherein the metal sheet (1) has a hardness that is the same or higher than the hardness of the connecting element (3), the joining opening (2, 2a) is designed with at least one edge-side profile (4, 4a, 4b) at least on the other surface side (1.1) of the sheet (1), and that the joining section (3.1) is plastically deformed over a partial length projecting over the other surface side (1.1) of the metal sheet (1) to form anchoring areas (8.1) extending into the at least one edge-side profile (4, 4a, 4b).

Further embodiments, advantages and possible applications of the invention are disclosed in the following description of exemplary embodiments and accompanying drawings. The subject of the present invention includes all characteristics described and/or illustrated individually or in any combination, regardless of their being summarized or referenced in the claims. The content of the claims is also included as part of the description.

Connecting elements according to the invention are generally press-in and/or rivet connecting elements, which can be anchored by joining and pressing at a joining opening of a metal sheet or a sheet metal part made of sheet metal. Connecting elements according to the invention are therefore in particular rivet and/or press-in nuts as well as rivet and/or press-in bolts with or without threads.

"Joining section" according to the invention refers to a section of the respective press-in and/or rivet connecting element, with which this element can be inserted and anchored on the metal sheet or sheet metal part by plastic deformation of the material.

BRIEF DESCRIPTION OF THE DRAWINGS

The invention is described below in detail based on exemplary embodiments with reference to the drawings, wherein:

FIG. 5 shows a partial representation in cross section of a die for anchoring the connecting element in the joining opening;

FIGS. 6 and 7 show representations as FIGS. 1 and 2 of a further embodiment of the invention.

DETAILED DESCRIPTION OF THE INVENTION

In FIGS. 1-5, 1 is a sheet metal component consisting for example of a stainless steel sheet with a joining opening 2, in which a connecting element 3 designed as a nut in the depicted embodiment is to be anchored by joining and pressing, namely with a high press-out force and torsional absorption. The special characteristic is that the hardness of the metal sheet forming the sheet metal component 1 is greater than or at least equal to the hardness of the connecting element 3.

Figure 1:
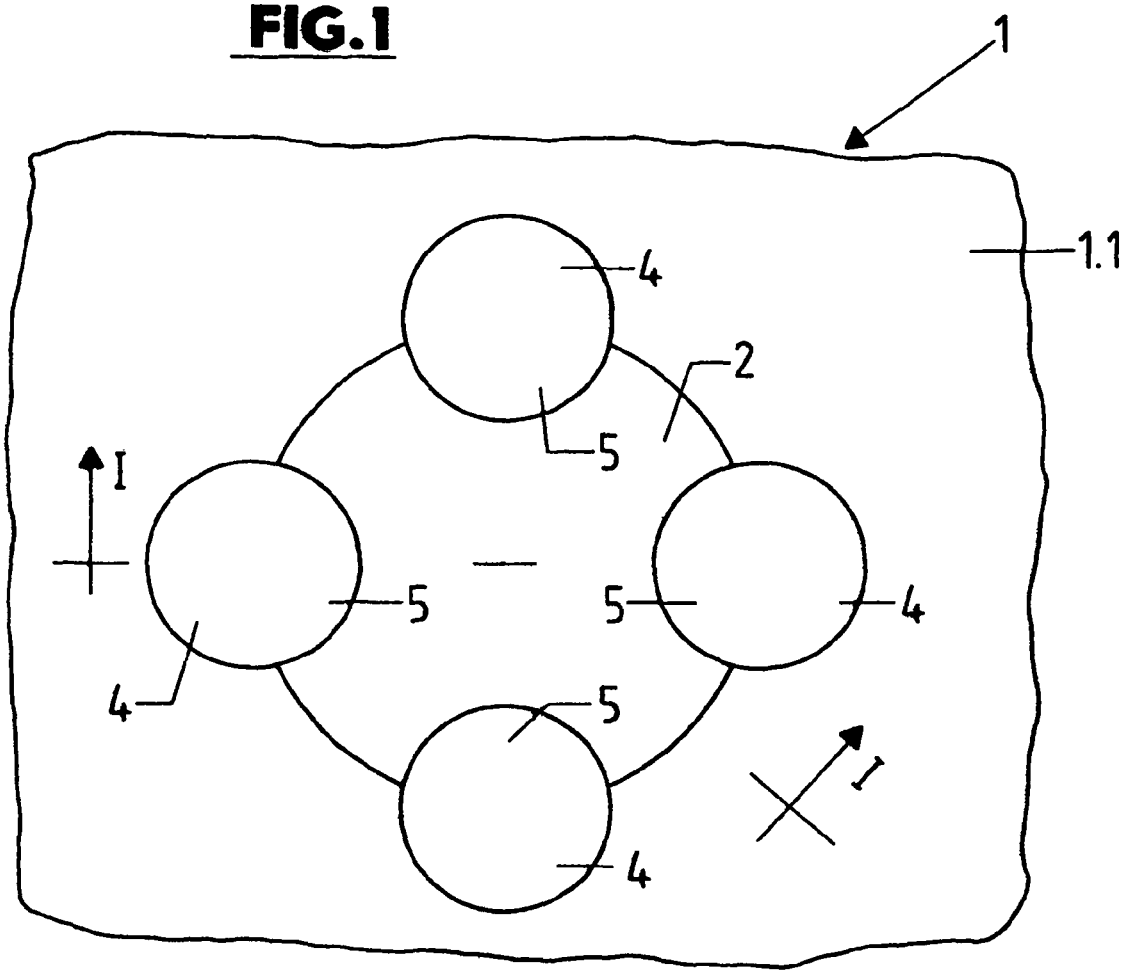
FIG. 1 shows a simplified plan view of the bottom of a sheet metal part made of a hard sheet metal, for example of stainless steel sheet metal, in the area of a joining opening.
Figure 2:
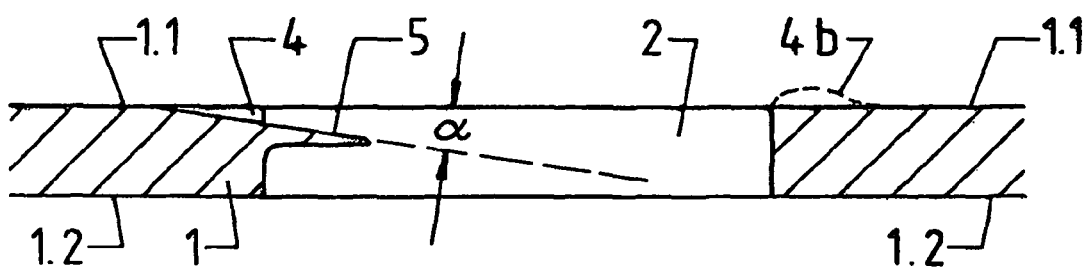
FIG. 2 shows a cross section corresponding to the line I-I.
Figure 3:
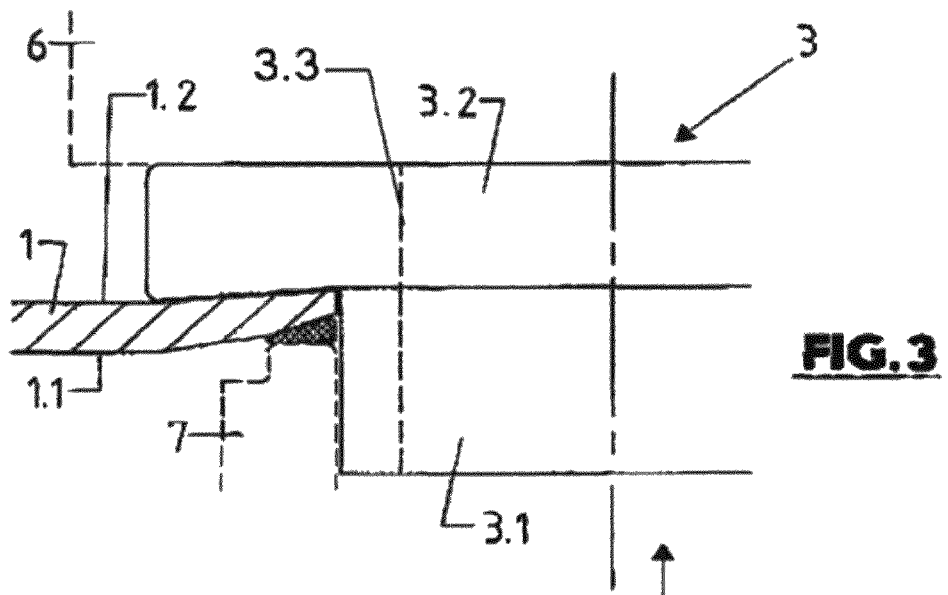
FIG. 3 shows an enlarged partial representation of the sheet metal component, together with a connecting element anchored in the joining opening.
Figure 4:
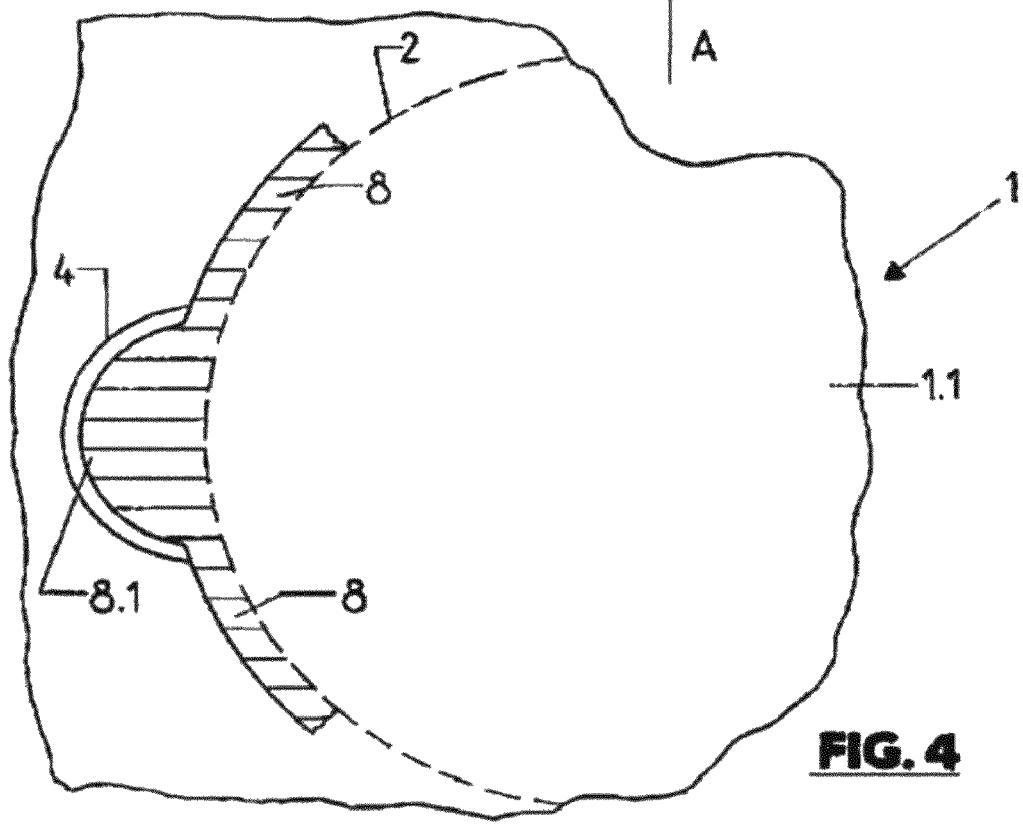
FIG. 4 shows a partial representation of the joining element anchored in the sheet metal component in a viewing direction corresponding to the arrow A in FIG. 3.

To achieve anchoring of the connecting element 3 in the sheet metal component 1 with the required high press-out force and torsional absorption, the joining opening is designed on the bottom side of the sheet 1.1 of the sheet metal component 1 in the manner depicted in FIGS. 1 and 2, namely so that the joining opening 2 expands slightly conically on the edge toward the top side 1.1 and also that several edge recesses 4 are formed on the edge of the joining opening 2, which (recesses) are open toward the bottom side 1.1 and also toward the joining opening 2 and the bottom surfaces of which enclose an acute angle with the plane of the bottom side 1.1 of the sheet, i.e. an angle a smaller than 45°, which opens toward the center of the joining opening 2.

The joining opening 2 with the edge recesses 4 is created for example in a punching or stamping process, namely in the manner that first the joining opening 2, which has a circular cross section in the depicted embodiment, is created by punching and afterwards the edge area of the joining opening 2 on the sheet bottom side 1.1 is plastically deformed with a suitable punch-like tool so that the edge recesses 4 are formed and the thereby displaced material of the sheet 1 yields into the joining opening 2, namely forming tongue-like projections 5 extending into the joining opening and each of which (projections) transforms into one edge recess 4.

The connecting element 3 is designed in the manner known in the art, essentially with a circular cylindrical sleeve-like joining section 3.1 on the outer surface and on one end of said section with a head section 3.2, which projects over the circumferential surface of the joining section 3.1. The connecting element 3 is further provided with a threaded hole 3.3, which is on the same axis as the axis of the circular cylindrical circumferential surface of the joining surface 3.1 and extends through the section 3.1 and the head section 3.2.

The outer diameter of the joining section 3.2 is the same or slightly smaller than the diameter of the joining opening 2 outside the projections 5. For fastening of the connecting element 3 on the sheet metal component 1, the connecting element 3 is inserted into the joining opening 2 with deformation of the projections 5, namely so that the head section 3.2 bears with its side facing the section 3.1 against the top side 1.2 of the sheet and the section 3.1 projects with a partial length over the bottom side 1.1 of the sheet.

Afterwards, in a press or press tool with the head section 3.1 supported against a support 6, a sleeve-like die 7 is used to achieve plastic deformation of the connecting element 3 is carried out in the area of the partial length of the joining section 3.1 projecting over the sheet bottom side 1.1, namely on the outer surface of said partial length by shearing in the manner that a lip 8 is formed from the area of the partial length of the joining section 3.1 projecting over the sheet bottom side 1.1, which (lip) projects slightly over the circumferential surface of the joining section 3.1 outside of the edge recesses 4 and therefore also over the edge of the joining opening 2 and/or is held in the conical extension of the joining opening 2. In the area of the edge recesses 4 the lip 8 forms projections 8.1, which extend very far, i.e. with a larger radial distance from the axis of the joining opening 2 or of the connecting element 3, into the respective edge recess 4. In the case of a fixed die 7, the support is formed for example by a press ram or plunger.

During anchoring of the connecting element 3 in the joining opening 2, the die 7, which with its die opening 7.1 encloses the partial length of the joining section 3.1 projecting over the sheet bottom side 1.1, exerts force almost exclusively on the connecting element 3, so that for the anchoring or pressing of the connecting element 3 in the sheet component 1, primarily this connecting element is deformed at the joining section 3.1 by shearing and no deformation or essentially no deformation of the sheet component 1, or at least no yielding of the material of the sheet component 1 takes place. For this purpose the die 7 is designed on its side acting on the connecting element 3 during anchoring and pressing with a projection 7.2 enclosing the open end of the die opening 7 there in a ring-like manner, so that the entire force during anchoring and pressing of the connecting element 3 is effectively concentrated as shearing force against the sheet bottom side 1.1 or into the edge recesses 4 for forming the lip 8 and for pressing the lip 8 and the projection 8.1.

The method described above achieves anchoring of the connecting element 3 with a high press-out force or high press-out stability and with high torsional absorption, i.e. with high stability against twisting, the latter particularly also due to the projections 8.1 formed into the edge recesses 4. After completion of the anchoring of the connecting element in the sheet 1, the lip 8 bears throughout its entire course, particularly also in the area of the edge recesses 4, with a high contact or pressing force against the edge area of the sheet 1 surrounding the joining opening 2.

In the depicted embodiment the connecting element 3 is provided on its front face of the head section 3.2 facing the joining section 3.1 with a recess 3.3 surrounding the joining section 3.1, namely in the form of a conical surface, so that the depth of this ring-shaped recess increases as the distance from the outer edge of the head section 3.2 increases. During pressing of the connecting element 3 in the sheet component 1 the edge area of the sheet component 1 surrounding the joining opening 2 is deformed into the recess 3.3, namely essentially by bending or stamping and without anchoring of the connecting element 3 in the sheet component 1 by yielding of the material of the sheet component 1. As a result of the recess 3.3 or of the deformation of the edge area of the joining opening 2 corresponding to said recess, room is made to accommodate the lip 8, so that the latter does not project over the sheet bottom side 1.1.

FIGS. 6 and 7 show a sheet component 1 with a joining opening 2a, the edge area of which is polygonal in shape at least on the sheet bottom side 1.1. The joining opening is manufactured for example in two steps, namely in the manner that first a pre-punched hole is punched in the form of a circular opening, and that in a subsequent stamping step a punch inserted into the pre-punched hole is used to deform the edge area of the pre-punched hole on the sheet bottom side 1.1 to produce the polygonal form. This creates edge recesses 4a, which are open toward the sheet bottom side 1.1 and also toward the joining opening 2a and preferably form beveled edges, which enclose an acute angle with the plane of the sheet bottom side 1.1, i.e. an angle α smaller than 45°, which opens toward the center of the joining opening.

After insertion of the connecting element 3 into the joining opening 2a, the connecting element 3 is likewise anchored and pressed on the sheet component 1 by means of permanent deformation, i.e. by shearing of the near-surface material of the joining section 3.1 to form a lip corresponding to the lip 8 with the areas or projections extending into the edge recesses 4a. Also in this embodiment the anchoring of the connecting element 3 in the sheet component 1 features high pull-out strength and stability against twisting.

Figure 8:
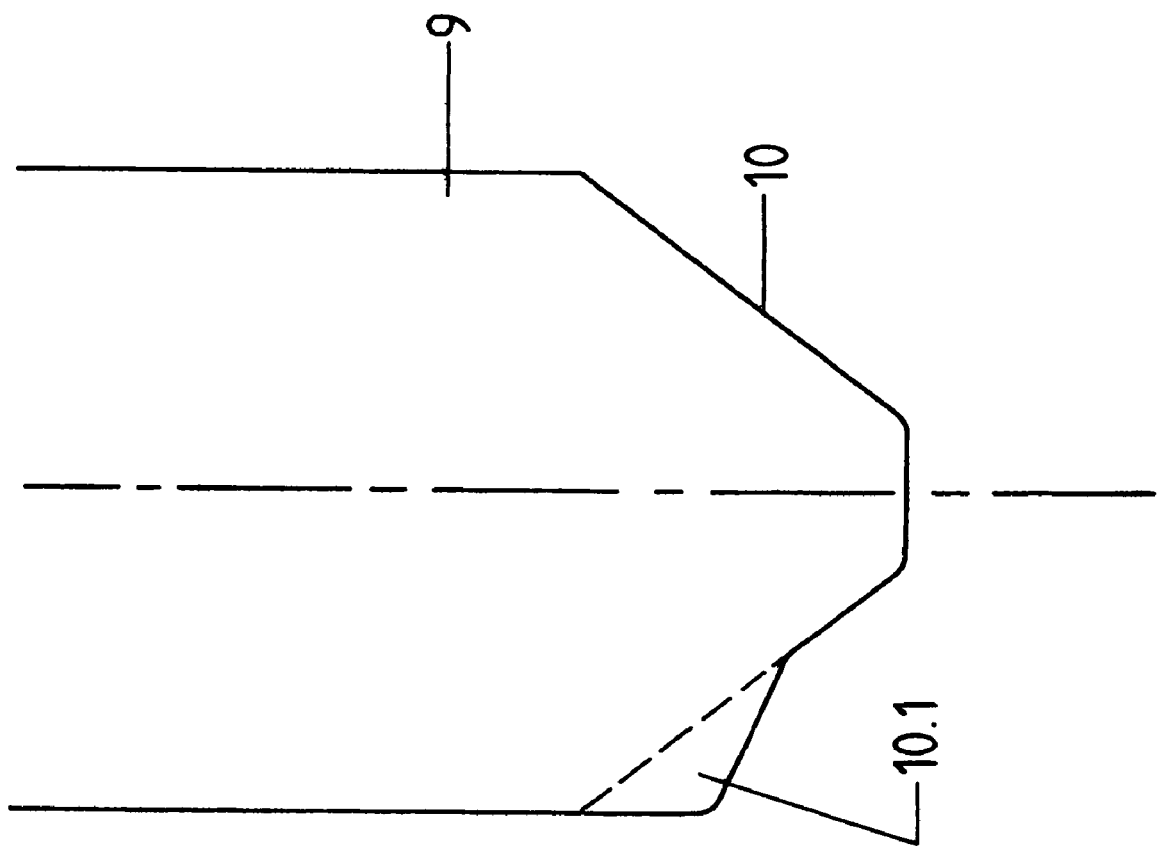
FIG. 8 shows a partial representation in cross section of a punch for forming the joining opening.

In FIG. 8, 9 designates a punch with which the edge recesses 4 or 4a are produced after pre-punching at the respective joining opening 2 or 2a. For this purpose the punch 9 features a conical tapered punch end 10 with projections 10.1 protruding radially over said end, with which (projections) the edge recesses are produced by stamping.

The invention was described above based on exemplary embodiments. It goes without saying that numerous modifications and variations are possible without abandoning the underlying inventive idea upon which the invention is based.

For example, it is possible to form or design the edge recesses in a different manner than described above, for example in the form of notches into which the material surrounding the joining opening is inserted.

Further, it is possible to design the respective joining opening so that it is completely polygonal, preferably with a slight bevel or conical extension in the edge area on the sheet bottom side 1.1, in which case in this embodiment the die 7 is used to form material sections or projections from the near-surface material of the joining section 3.1 of the lip corresponding to the lip 8 projecting over the edge of the joining opening into the corner areas of the polygonal cross section of the joining opening, in order to achieve anchoring with high pull-out or press-in stability and high torsional absorption.

It was assumed in the above description that the anchoring of the connecting element 3 is achieved by deformation of the near-surface material of the joining section 3.1 by means of shearing. Of course, other techniques are also conceivable for permanent deformation of the joining section 3.1, for example riveting.

It was also assumed above that the connecting element 3 is a nut. Of course, the connecting element can also be a different connecting element, for example a bolt.

Instead of the edge recess 4 or 4a, a different edge profile can be provided, for example in the form of one or more projections 4b provided on the edge of the joining opening 2 or 2a in the sheet 1. It is further possible to form the edge-side profile additionally or only from a polygonal opening edge of the joining opening, e.g. on one or both surface sides of the component 1.

REFERENCE LIST 1 component or metal sheet
1.1 bottom side of metal sheet
1.2 top side of metal sheet
2, 2a joining opening
3 connecting element
3.1 sleeve-like joining section of the connecting element 3
3.2 head section of the connecting element 3
4, 4a edge recess
4b projection
5 tongue-like projection
6 support
7 die
7.1 die opening
7.2 ring-like projection
8 lip
8.1 projection
9 punch
10 conical punch end
10.1 projection on the conical surface

The invention claimed is:

1. A method for inserting a connecting element in a metal sheet the method comprising the steps of:
   providing a joining opening in the metal sheet with at least one edge profile on a first surface side of the metal sheet, the metal sheet having a hardness that is equal to or greater than a hardness of a connecting element;
   inserting a bolt-like or sleeve-like joining section of the connecting element into the joining opening provided in the metal sheet, so that the connecting element bears with an extended connecting element head section against another surface side of the metal sheet and projects with a partial length of the joining section over the first surface side of the metal sheet, and
   subsequent fixing of the connecting element in the metal sheet through plastic material deformation by applying a pressing force,
   wherein during pressing the joining section is plastically deformed to form anchoring areas extending into the at least one edge-side profile, and
   wherein the at least one edge recess has a bottom surface in the form of a beveled edge, which forms with a plane of the first surface side an acute angle, that opens into the joining opening.

2. The method according to according to claim 1, wherein the at least one edge-side profile is produced so that it extends only over a part of the edge area of the joining opening.

3. The method according to according to claim 1, wherein at least two edge-side profiles are provided at a distance from each other on the joining opening.

4. The method according to according to claim 1, wherein the sheet is pre-punched to produce the joining opening and afterwards the at least one edge-side profile is produced by material deformation.

5. The method according to claim 4, wherein the pre-punching is carried out with a diameter that is the same or essentially the same as the diameter of the joining opening.

6. The method according to claim 4, wherein the pre-punching and formation of the edge-side profile take place in two process steps with two tools.

7. The method according to claim 4, wherein the pre-punching and formation of the edge-side profile take place in a single process steps with one tool.

8. The method according to claim 1, wherein the joining opening is circular or essentially circular.

9. The method according to claim 1, wherein the joining opening has a polygonal edge shape at least on the first surface side of the metal sheet.

10. The method according to claim 1, wherein the metal sheet is a component or part of a component manufactured from a sheet metal material by punching or bending.

11. The method according to claim 1, wherein the deformation of the joining section is achieved by shearing or riveting.

\* \* \* \* \*